United States Patent
Patnaik et al.

(10) Patent No.: US 9,984,359 B1
(45) Date of Patent: May 29, 2018

(54) METHOD AND SYSTEM FOR A NETWORK OF MERCHANTS COLLECTING PAYMENTS FOR EACH OTHER

(71) Applicants: Akaash Patnaik, Bangalore (IN); A. Premasis Patra, Bangalore (IN)

(72) Inventors: Akaash Patnaik, Bangalore (IN); A. Premasis Patra, Bangalore (IN)

(73) Assignee: Intuit Inc., Mountain View, CA (US)

( * ) Notice: Subject to any disclaimer, the term of this patent is extended or adjusted under 35 U.S.C. 154(b) by 547 days.

(21) Appl. No.: 14/534,760

(22) Filed: Nov. 6, 2014

(51) Int. Cl.
*G06Q 40/00* (2012.01)
*G06Q 20/14* (2012.01)
*G06Q 20/08* (2012.01)

(52) U.S. Cl.
CPC ........... *G06Q 20/14* (2013.01); *G06Q 20/085* (2013.01)

(58) Field of Classification Search
CPC ...... G06Q 20/04; G06Q 20/042; G06Q 20/10; G06Q 20/102; G06Q 20/108
See application file for complete search history.

(56) References Cited

U.S. PATENT DOCUMENTS

| | | | | |
|---|---|---|---|---|
| 6,289,322 B1* | 9/2001 | Kitchen | ................ | G06Q 20/04 705/34 |
| 7,347,368 B1* | 3/2008 | Gravelle | ................ | G06Q 20/20 235/380 |
| 2002/0038289 A1* | 3/2002 | Lawlor | ................. | G06Q 20/04 705/42 |
| 2005/0010478 A1* | 1/2005 | Gravelle | ................ | G06Q 20/20 705/16 |
| 2007/0061256 A1* | 3/2007 | Park | ...................... | G06Q 20/10 705/40 |
| 2007/0138268 A1* | 6/2007 | Tuchman | .............. | G06Q 30/02 235/383 |
| 2007/0198432 A1* | 8/2007 | Pitroda | .................. | G06Q 20/02 705/64 |
| 2007/0203835 A1* | 8/2007 | Cai | ........................ | G06Q 40/00 705/43 |
| 2007/0265935 A1* | 11/2007 | Woycik | ................ | G06Q 20/367 705/65 |
| 2008/0015908 A1* | 1/2008 | Ramseyer | ............. | G06Q 10/02 705/5 |
| 2009/0327111 A1* | 12/2009 | Bulawa | ................ | G06Q 20/102 705/34 |

* cited by examiner

*Primary Examiner* — Bruce I Ebersman
*Assistant Examiner* — Mark H Gaw
(74) *Attorney, Agent, or Firm* — FBFK PC

(57) ABSTRACT

A method and system for obtaining payment from a customer that includes receiving a collection request at a payment facilitation device from a payment collection request device of a merchant, storing the collection request in a collection request repository, determining, using the collection request, a location of the customer, and determining, using the location of the customer, that an in-person payment device of a collecting entity is located near the location of the customer. The method also includes transmitting a notice of collection request to the in-person payment device and receiving a payment request from the in-person payment device at which the customer made a payment via the in-person payment device after the notice of collection request was received by the in-person payment device. Additionally, the method includes transmitting, based on the payment request, a payment to a merchant account associated with the merchant.

20 Claims, 4 Drawing Sheets

METHOD AND SYSTEM FOR A NETWORK OF MERCHANTS COLLECTING PAYMENTS FOR EACH OTHER

BACKGROUND

Generally, merchants sell goods and/or services and receive payment in return. Many sales are performed with the customer being physically present, and so the merchant may collect payment from the customer using any standard, in-person payment mechanism (e.g., cash, credit card, debit card, etc.). However, merchants may also accept payments remotely. For example, a merchant may ship products to and/or perform services for a customer and then send an invoice requesting payment for the shipment and/or service. When a merchant chooses to accept remote payments from customers, the merchant may have less control over when the merchant is paid because, at least in part, proactive steps must be taken by the customer in order to make the remote payment to the merchant (e.g., paying online, sending money via wire transfer, etc.).

SUMMARY

In general, in one aspect, the invention relates to a method for obtaining payment from a customer that includes receiving a collection request at a payment facilitation device from a payment collection request device of a merchant, storing the collection request in a collection request repository, determining, using the collection request, a location of the customer, and determining, using the location of the customer, that an in-person payment device of a collecting entity is located near the location of the customer. The method also includes transmitting a notice of collection request to the in-person payment device and receiving a payment request from the in-person payment device at which the customer made a payment via the in-person payment device after the notice of collection request was received by the in-person payment device. Additionally, the method includes transmitting, based on the payment request, a payment to a merchant account associated with the merchant.

In general, in one aspect, the invention relates to a system for obtaining payment from a customer that includes a payment collection request device, an in-person payment device, a computer processor, a collection request repository, and a payment facilitation device. The payment facilitation device includes the computer processor and operatively connected to the payment collection request device and the in-person payment device. The payment facilitation includes functionality to receive a collection request at a payment facilitation device from the payment collection request device of a merchant, store the collection request in a collection request repository, determine, using the collection request, a location of the customer, and determine, using the location of the customer, that an in-person payment device of a collecting entity is located near the location of the customer. The payment facilitation device also includes functionality to transmit a notice of collection request to the in-person payment device, receive a payment request from the in-person payment device at which the customer made a payment via the in-person payment device after the notice of collection request was received by the in-person payment device, and transmit, based on the payment request, a payment to a merchant account associated with the merchant.

In general, in one aspect, the invention relates to a non-transitory computer readable medium that includes instructions for obtaining payment from a customer which, when executed by a computer, cause a computer processor to receive a collection request at a payment facilitation device from a payment collection request device of a merchant, store the collection request in a collection request repository, determine, using the collection request, a location of the customer, and determine, using the location of the customer, that an in-person payment device of a collecting entity is located near the location of the customer. The non-transitory computer readable medium also includes instructions which cause the computer processor to transmit a notice of collection request to the in-person payment device, receive a payment request from the in-person payment device at which the customer made a payment via the in-person payment device after the notice of collection request was received by the in-person payment device, and transmit, based on the payment request, a payment to a merchant account associated with the merchant.

Other aspects of the invention will be apparent from the following description and the appended claims.

DETAILED DESCRIPTION

Figure 1:
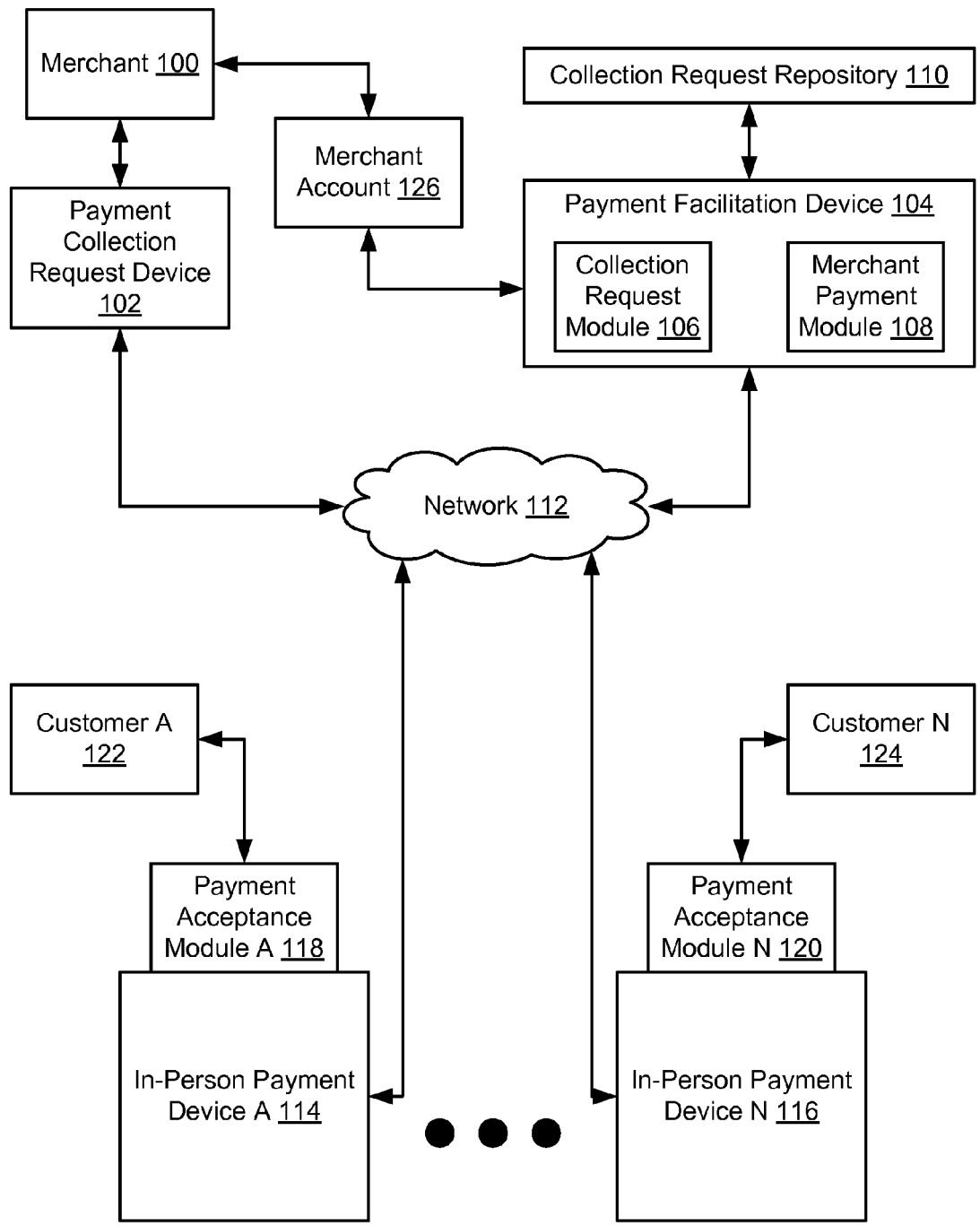
FIG. 1 shows a system in accordance with one or more embodiments of the invention.

Specific embodiments of the invention will now be described in detail with reference to the accompanying figures. Like elements in the various figures may be denoted by like reference numerals and/or like names for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method and system for obtaining payments from customers. Specifically, in one or more embodiments of the invention, a payment facilitation device includes functionality to receive at least one payment collection request from a merchant, and to transmit the request to an in-person payment device of one or more collecting entities (e.g., other merchants, payment collection machines, etc.) that are more physically proximate to the location of the customer from which the merchant seeks payment than is the merchant seeking payment. More specifically, the payment facilitation device transmits a payment collection request to devices of one or more entities who are physically located near the customer and have the capacity (e.g., an appropriate in-person payment device) to accept payment from the customer. The customer may pay the collecting entity using any form of payment accepted by the in-person payment device of the collecting entity. In one or more embodiments of the invention, the payment is transmitted back to the payment facilitation device and, ultimately, to an account (e.g., a merchant bank account) of the merchant that requested the payment.

FIG. 1 shows a block diagram of a system in accordance with one or more embodiments of the invention. Specifically, in one or more embodiments of the invention, the system includes a merchant (100) operatively connected to and/or operating a payment collection request device (102). The payment collection request device (102) may be operatively connected, via a network (112), to a payment facilitation device (104). The merchant (100) may have a merchant account (126) that is operatively connected to the merchant (100) and/or the payment facilitation device (104). The payment facilitation device (104) may include a collection request module (106) and a merchant payment module (108). Additionally, the payment facilitation device may be operatively connected to and/or include a collection request repository (110). The system may also include one or more in-person payment devices (e.g., in-person payment device A (114); in-person payment device N (116)) which are operatively connected to the payment facilitation device (104) via the network (112). In one or more embodiments of the invention, each of the in-person payment devices (e.g., in-person payment device A (114); in-person payment device N (116)) is operatively connected to and/or includes a payment acceptance module (e.g., payment acceptance module A (118); payment acceptance module N (120)). The payment acceptance module (e.g., payment acceptance module A (118); payment acceptance module N (120)) may be, at the time of an in-person payment by a customer (e.g., customer A (122); customer N (124)), operatively connected to the customer making the payment. Each of the aforementioned components is described below.

In one or more embodiments of the invention, a merchant (100) is any entity (e.g., one or more persons, a corporation, a partnership) organized, at least in part, in order to provide goods and/or services to one or more customers (e.g., customer A (122), customer N (124)). In one or more embodiments of the invention, a merchant's business model may include functionality to provide goods and/or services to customers who do not pay the merchant (100) at the time of the transaction and who may be located remote from the merchant. For example, a merchant (100) may accept orders for goods and/or services from remote customers (e.g., customer A (122), customer N (124)). In such an example, the merchant (100) may ship the goods and/or perform the services without receiving payment first, and then concurrently or subsequently issue an invoice to the customer (i.e., bill the customer) that includes a request for payment.

In one or more embodiments of the invention, the merchant may have one or more merchant accounts (e.g., merchant account (126)). In one or more embodiments of the invention, a merchant account (126) is any repository in which the merchant (100) stores assets. For example, the merchant account (126) may be a bank account associated with the merchant (100). In one or more embodiments of the invention, the merchant account (126), in addition to being accessible to the merchant (100), is operatively connected to a payment facilitation device (104) (described below).

FIG. 1 shows an embodiment of the invention in which the merchant (100) and the payment facilitation device (104) directly connected to the merchant account (126). Such a connection may be achieved via any method, including but not limited to, in-person transaction and/or interaction, telephonic transaction and/or interaction, via automated teller machines, etc. One of ordinary skill in the art, having the benefit of this disclosure, will appreciate that the merchant and/or the payment facilitation device may also interact and/or conduct transactions with the merchant account via a network (e.g., network (112)) such as the Internet.

In one or more embodiments of the invention, a network (112) is a collection of one or more network devices (not shown) that facilitates network connectivity for one or more operatively connected devices (e.g., computing devices). In one or more embodiments of the invention, the network (112) may be all or a portion of a computer network. A computer network may include a datacenter network, a wide area network, a local area network, a wireless network, a cellular phone network, or any other suitable network that facilitates the exchange of information from one part of the network to another. The network (112) may be coupled with or overlap with the Internet. In one or more embodiments of the invention, devices connected to the network have a network connection.

In one or more embodiments of the invention, the merchant (100) is operatively connected to and/or operates a payment collection request device (102). In one or more embodiments of the invention, a payment collection request device (102) is a device that includes functionality to generate and/or transmit collection requests (not shown). In one or more embodiments of the invention, a collection request is a request from a merchant (100) seeking payment from a customer (e.g., customer A (122), customer N (124)) and includes, but is not limited to, information associated with the customer (e.g., name, location information, etc.) and information regarding an amount that the merchant (100) is requesting as payment from the customer (e.g., customer A (122), customer N (124)).

In one or more embodiments of the invention, the payment collection request device (102) includes hardware (e.g., circuitry), software, firmware, or any combination thereof, that includes functionality to perform at least some functions described in accordance with one or more embodiments of the invention. For example, the payment collection request device (102) may be a specialized software application, or a portion thereof, executing on a computing device. In one or more embodiments of the invention, a computing device is any device and/or any set of devices capable of electronically processing instructions and that includes at least the minimum processing power, memory, input and output device(s), and network connectivity in order to contribute to the performance of at least some portion of the functions described in accordance with one or more embodiments of the invention. Examples of computing devices include, but are not limited to, a server (e.g., a blade-server in a blade-server chassis), a virtual machine (VM), a desktop computer, a mobile device (e.g., laptop computer, smart phone, personal digital assistant, tablet computer, or any other mobile computing device), and/or any other type of computing device with the aforementioned minimum requirements.

In one or more embodiments of the invention, the payment collection request device (102) is operatively connected to a payment facilitation device (104). For example, the payment collection request device (102) may be operatively connected to a payment facilitation device via a network (112). In one or more embodiments of the invention, a payment facilitation device (104) is hardware, software, firmware, or any combination thereof that includes functionality, at least, to receive and/or store collection requests and/or to receive and/or transmit payments. For example, a payment facilitation device (104) may be at least a portion of a software application executing on a computing device. For another example, the payment facilitation device (104) may be a special purpose device that uses hardware (e.g., one or more circuit elements) to perform, at least in part, functionality (e.g., alphanumeric comparisons) in accordance with one or more embodiments of the invention.

In one or more embodiments of the invention, the payment facilitation device (104) is, at least in part, a software application, or a portion thereof, written in any programming language that includes instructions stored on a non-transitory computer readable medium which, when executed by one or more processors in a computing device, enable the computing device to perform the functions described in accordance with one or more embodiments of the invention.

In one or more embodiments of the invention, the payment facilitation device (104) includes a collection request module (106). In one or more embodiments of the invention, a collection request module (106) is any hardware, software, firmware, and/or any combination thereof that includes functionality to process, at least in part, collection requests. Processing collection requests may include, but is not limited to, receiving collection requests from payment collection request devices (102) of merchants (100), transmitting collection requests to in-person payment devices (e.g., in-person payment device (114)), and/or storing collection requests and/or related information in a data repository (e.g., collection request repository (110)). For example, the collection request module (106) may be a portion of a software application implementing at least part of the functionality of the payment facilitation device (104). In such an example, the authorization module may execute in an application layer, and the network stack (not shown) of the underlying hardware (not shown) and/or operating system (not shown) may include functionality to pass to and/or receive from the collection request module (106) one or more collection requests.

In one or more embodiments of the invention, the payment facilitation device (104) includes a merchant payment module (108). In one or more embodiments of the invention, a merchant payment module (108) is any hardware, software, firmware, and/or any combination thereof that includes functionality to process payments made in response to collection requests. Processing payments may include, but is not limited to, receiving payment and/or related information from one or more in-person payment devices (e.g., in-person payment device A (114), in-person payment device A (120)) and transmitting payment and/or related information to a merchant account (126) associated with the merchant (e.g., 100) that initiated the collection request which lead to the payment. For example, the merchant payment module (108) may be a software application, or a portion thereof implementing at least part of the functionality of the payment facilitation device (104) related to processing payments.

In one or more embodiments of the invention, the payment facilitation device (104) includes and/or is operatively connected to a collection request repository (110). In one or more embodiments of the invention, the collection request repository (110) is a data repository. In one or more embodiments of the invention, a data repository is any type of storage unit and/or device (e.g., a file system, database, collection of tables, or any other storage mechanism) for storing data/information. Specifically, the data repository may include hardware and/or software. Further, the data repository may include multiple different storage units and/or devices. The multiple different storage units and/or devices may or may not be of the same type or located at the same physical site. In one or more embodiments of the invention, the collection request repository (110) is included as a part of the payment facilitation device (104). In other embodiments of the invention, the collection request repository (110) is a stand-alone repository that is operatively connected to and accessed, at least, by the payment facilitation device (104). In one or more embodiments of the invention, the collection request repository (110) includes functionality to receive and store information related to collection requests from, and provide information related to collection requests to, the payment facilitation device and/or one or more modules therein.

In one or more embodiments of the invention, the payment facilitation device is operatively connected (e.g., via a network (112)) to one or more in-person payment devices (e.g., in-person payment device A (114), in-person payment device A (114)). In one or more embodiments of the invention, an in-person payment device (e.g., in-person payment device A (114), in-person payment device A (116)) is any device capable of accepting any type of payment from a customer who is physically near (i.e., presently co-located with) the in-person payment device. In one or more embodiments of the invention, an in-person payment device (e.g., in-person payment device A (114), in-person payment device A (116)) is a software application, or a portion thereof, executing on a computing device of an collecting entity (e.g., another merchant (not shown)). For example, the in-person payment device may include payment acceptance software executing on a smart phone. In one or more embodiments of the invention, the in-person payment device (e.g., in-person payment device A (114), in-person payment device A (116)) includes functionality to accept payments from customers and to transmit payment and/or payment related information (e.g., a payment request to pay the merchant using payment details) to a payment facilitation device (104).

In one or more embodiments of the invention, an in-person payment device includes and/or is operatively connected to at least one payment acceptance module (e.g., payment acceptance module (118), payment acceptance module (120)). In one or more embodiments of the invention, a payment acceptance module (e.g., payment acceptance module (118), payment acceptance module (120)) is any device that facilitates acceptance of any form of payment from a customer (e.g., customer A (122), customer A (124)). For example, the payment acceptance module may include functionality to accept a payment card (not shown) from a customer (e.g., customer A (122), customer A (124)) seeking to make a payment.

A payment card, as used herein, refers to any payment mechanism issued to a customer from an issuing entity, such as a bank (e.g., an issuing bank), for use in making purchases. Examples of payment cards include, but are not limited to, a credit card, a debit card, a smart card, a key fob, software executing on a computing device (e.g., a mobile phone), a prepaid card, a wristband, a digital wallet, etc.

Other payment mechanisms that may be accepted by a payment acceptance module (e.g., payment acceptance module (118), payment acceptance module (120)) include paper currency (e.g., dollars), metal currency (e.g., coins), digital currency (e.g., bitcoins), and/or any other form of currency that exists now or may be developed at any time in the future that is exchanged by entities (e.g., people, robots, etc.) in order to pay for goods and/or services (i.e., as a medium of exchange).

In one or more embodiments of the invention, a payment acceptance module (e.g., payment acceptance module (118), payment acceptance module (120)) includes appropriate hardware to accept payment from a customer. For example, the payment acceptance device (e.g., payment acceptance module (118), payment acceptance module (120)) may include a channel in which a credit card and/or debit card may be swiped. In such an example, the payment acceptance module channel may be configured with a magnetic card reader, which, when a card with a magnetic strip is swiped though it, uses a magnetic reading head to obtain information related to the cardholder and one or more associated accounts (e.g., a checking account, a credit line, etc.).

In one or more embodiments of the invention, a customer (e.g., customer A (122), customer A (124)) is any entity that engages in a transaction for the conveyance of goods and/or services from a merchant. In one or more embodiments of the invention, a customer (e.g., customer A (122), customer A (124)) is located remotely from a merchant from whom the customer makes a purchase. In such embodiments of the invention, the customer is unable to make in-person payments directly to the merchant. For example, a customer may be a person who places an order online for delivery of a good. As another example, a customer may be a company who purchases large orders of equipment and/or supplies from one or more equipment and/or supply merchants.

While FIG. 1 shows a configuration of components, other configurations may be used without departing from the scope of the invention. For example, various components may be combined to create a single component. As another example, the functionality performed by a single component may be performed by two or more components. In one or more embodiments of the invention, one or more of the modules and elements shown in FIG. 1 may be omitted, repeated, and/or substituted. Accordingly, embodiments of the invention should not be considered limited to the specific arrangements of modules and elements shown in FIG. 1.

Figure 2:
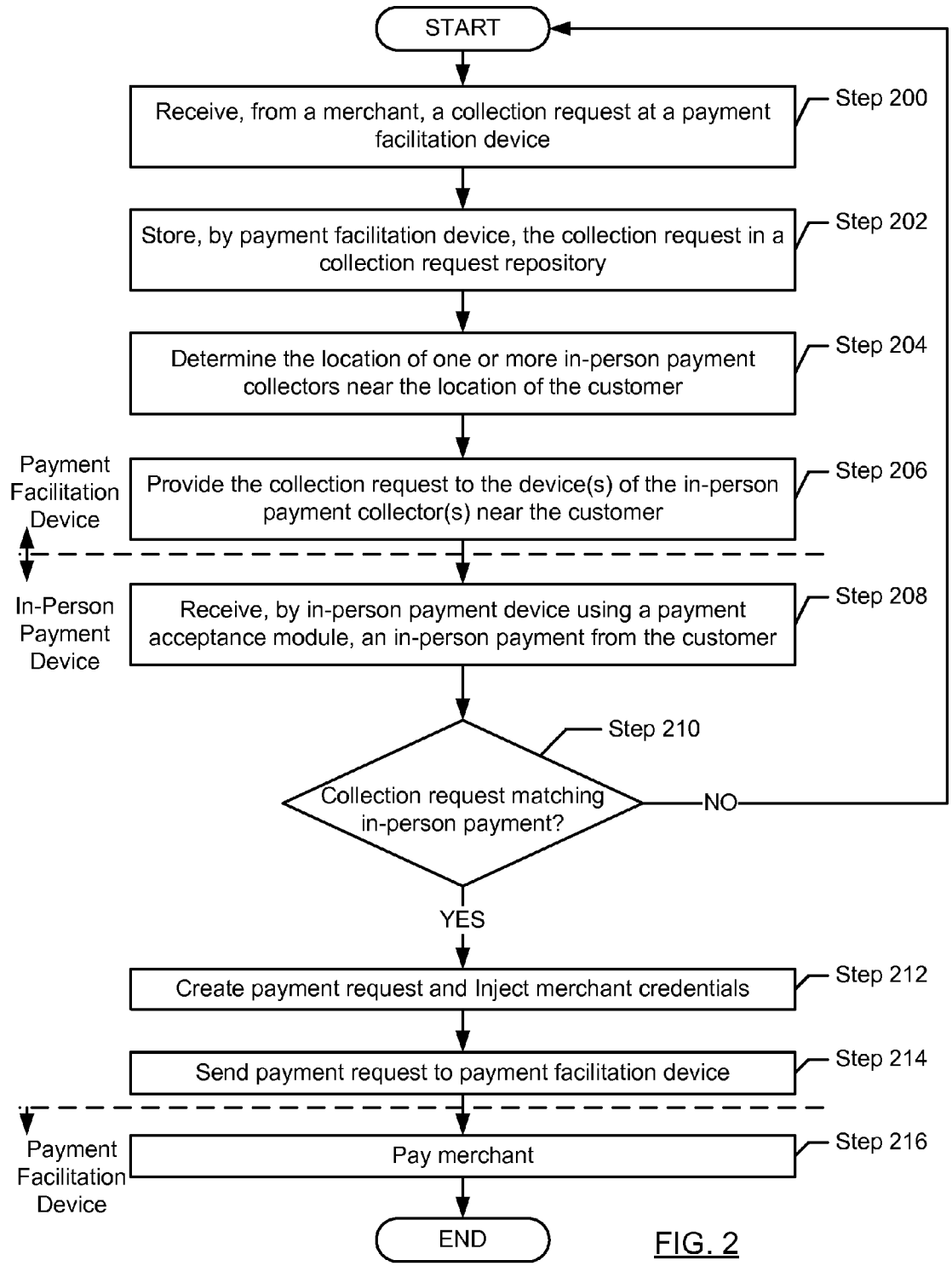
FIG. 2 shows a flowchart in accordance with one or more embodiments of the invention.

FIG. 2 shows a flowchart in accordance with one or more embodiments of the invention. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 2 shows a flowchart describing a method for processing payments in accordance with one or more embodiments of the invention. In Step 200, in one or more embodiments of the invention, a collection request is received from a merchant by a payment facilitation device (e.g., via a payment collection request device). In one or more embodiments of the invention, the collection request is received via a network connection. In one or more embodiments of the invention, the payment facilitation device is operated by a third party that has a relationship with both the merchant and at least one merchant account (e.g., a bank account). For example, the payment facilitation device may be operated by a Software-as-a-Service (SaaS) provider with which the merchant has an agreement by which the merchant obtains software and related products.

In Step 202, the collection request is stored in a collection request repository. In one or more embodiments of the invention, the collection request repository is a data repository for storing a plurality of collection requests, each associated with the merchant making the request. In one or more embodiments of the invention, storing the collection request includes executing write instructions that modify a storage medium (e.g., a data repository) such that the storage medium includes (i.e., stores) information included in and/or related to the collection request. For example, information related to the customer from whom payment is sought along with information relate to the requested payment amount may be stored.

In Step 204, the location of the customer is determined. In one or more embodiments of the invention, the payment facilitation device uses location information related to the customer from the collection request in order to determine the location of one or more in-person payment collection devices of one or more collecting entities in the vicinity of the customer. For example, if the collection request included address information of the business location of a business customer, then the payment facilitation device may use such information to discover one or more in-person payment devices operated by one or more collecting entities that are within ten miles of the location of the customer.

In Step 206, notification of the collection request is provided to an in-person collection device of at least one of the in-person payment collectors identified in Step 204. In one or more embodiments of the invention, the notification includes information related to the collection request. Such information may include, but is not limited to, customer location information, payment amount information, and information regarding the underlying transaction giving rise to the collection request. In one or more embodiments of the invention, notification of the collection request is transmitted to the in-person payment device via a network. For example, if the in-person payment collection device is a smart phone with an attached card reader and executing payment collection software, the payment facilitation device may transmit the collection request to the in-person payment device, at least in part, via a wireless network to which the smart phone is operatively connected.

In Step 208, after locating the customer, the in-person payment collection device receives an in-person payment from a customer. In one or more embodiments of the invention, receiving an in-person payment includes receiving payment from a customer, or a person acting on behalf of a customer (e.g., a corporate officer of a business entity), via any form of physical interaction. Forms of physical interaction may include, but are not limited to, swiping a card, passing a key fob in front of a reader, placing a smart card against or near a smart card reader, accepting currency of any type, accepting a check, accepting payment proffered via a mobile computing device, and/or any other form of payment. In one or more embodiments of the invention, and in-person payments leads to one or more lower transaction fees charged to the merchant that receives the payment. For example, the merchant may receive a one or more lower fees from a card network than the merchant would have received if the payment had been obtained online or via a telephone call In Step 210, the in-person payment device determines if the accepted payment from the customer matches any outstanding collection request received from the payment facilitation device. In one or more embodiments of the invention, information received as a part of the payment transaction that relates to the payment and/or the customer making the payment is compared with the information related to the collection request that was received in the notification of the collection request. In the event that such a comparison yields no match, the process returns to start and awaits another payment from a customer. If the comparison successfully matches a payment received from a customer and a collection request, the process proceeds to step 212.

In Step 212, the in-person payment device generates a payment request (e.g., a request to pay a merchant) based at least in part on the payment received from the customer. In one or more embodiments of the invention, generation of the payment request includes injecting credentials related to the merchant (e.g., merchant information) that created the collection request into the payment request. For example, a payment request from the in-person payment device may ordinarily include information related to the in-person payment collector (i.e., the collecting entity). However, after the injection of the merchant credentials, the payment request may appear to be from the merchant rather than the in-person payment collector. In one or more embodiments of the invention, the payment request is for the full amount of the payment requested in the collection request. In other embodiments, the payment request may be for less than the payment amount requested in the collection request. In such embodiments of the invention, there may be one or more additional payment requests sent that request the remainder of the original payment amount requested in the collection request. For example, if the original payment amount was fifty dollars, the in-person payment device may generate two payment requests. The first payment request may be for forty-five dollars and include the injected merchant information. The second payment request may be for the remaining five dollars and may include information related to the in-person payment collector rather than the merchant. In such an example, the five dollars may represent the motivating factor driving the collecting entity to seek payment from the customer on behalf of the merchant.

In Step 214, the payment request generated in Step 212 is sent (e.g., via a network) to the payment facilitation device. In one or more embodiments of the invention, if more than one payment request was generated, then each payment request is sent to the payment facilitation device.

In Step 216, payment is provided, based on the payment request, to the merchant that created the collection request. In one or more embodiments of the invention, if additional payment requests are received by the payment facilitation device, then the additional payment requests are satisfied by providing payment to the entity identified in the additional payment request. For example, if the additional payment request includes information related to the collecting entity, then the additional payment request may be satisfied by providing payment to an account of the collecting entity.

Figure 3:
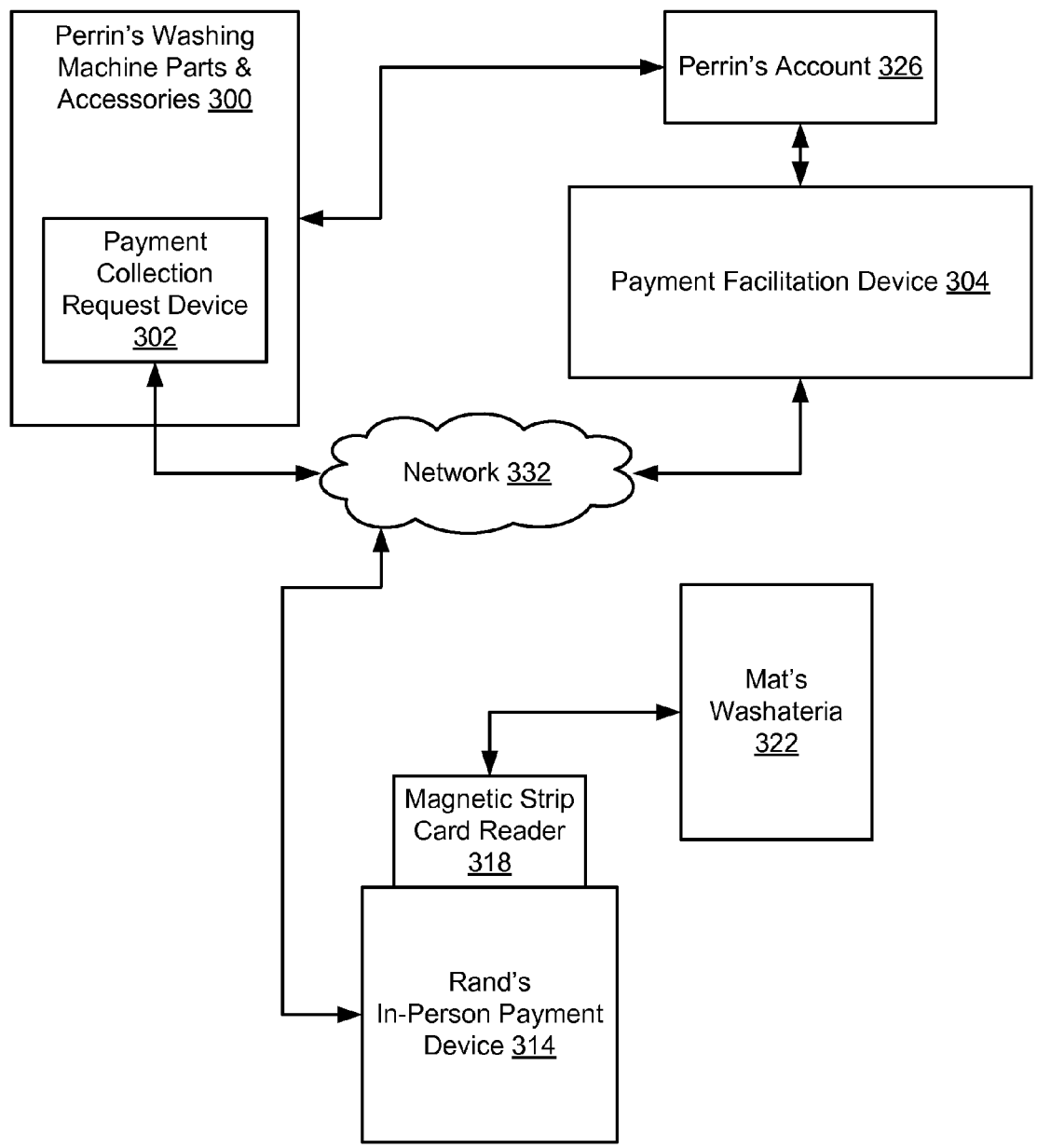
FIG. 3 shows an example in accordance with one or more embodiments of the invention.

FIG. 3 shows an example in accordance with one or more embodiments of the invention. The following example is for explanatory purposes only and not intended to limit the scope of the invention.

Referring to FIG. 3, consider a scenario in which Mat's Washateria (322) has twenty-seven washing machines (not shown) in a coin-operated Washateria located in the town of Camelyn. Unfortunately for Mat, the only merchant that sells parts and accessories for the particular type of washing machines that the Washateria owns is Perrin's Washing Machine Parts & Accessories (300), which is located in the town of Emond's Field and is located over 200 miles to the southwest of Camelyn. Perrin's has a relationship with a software provider who operates a payment facilitation device (304). Perrin's also includes a payment collection request device (302) that is operatively connected to the payment facilitation device via a network (332). Furthermore, Perrin's has a merchant bank account (e.g., Perrin's Account (326)) that is used, at least in part, to accept payments for washing machine parts and accessories.

In such a scenario, Mat orders $4,351.00 worth of washing machine accessories from Perrin's, thus making Mat's Washateria (322) a customer of Perrin's Washing Machine Parts & Accessories (300). Perrin's ships the order to Mat's a few days after receiving the order. Perrin's also transmits an invoice to Mat's via email for the full purchase price. However, as the merchant and the customer are hundreds of miles from one another, making an in-person payment is impractical for Mat's Washateria (322).

Because Mat's always makes payments using a company credit card, Perrin's will be charged a higher rate by the card network brand on Mat's payment card if the payment is not made in person than if the payment is made in person. Additionally, Mat's is known in the industry to be much more prompt at making payments when presented with the opportunity to make an in-person payment rather than a remote payment. Therefore, rather than request that Mat's make a remote payment, Perrin's uses the payment collection request device (302) located in the Washing Machine Parts & Accessories store location to transmit a collection request to the payment facilitation device (304) via the network (332).

After receiving the collection request, the payment facilitation device (304) uses information related to the customer included in the collection request in order to determine if any in-person payment devices of any collecting entities are located near Mat's Washateria. Fortunately, the payment facilitation device (304) determines that a collecting entity called Rand (not shown), a door-to-door vacuum cleaner salesman is carrying an in-person payment device (314) and is within three miles of Mat's Washateria. The in-person payment device (314) is a smart phone that has, as an attachment, a magnetic strip card reader (318). Accordingly, the payment facilitation device (304) sends notification of the collection request to Rand's in-person payment device via the network (332). The notification includes, at least, the location of Mat's Washateria and the payment amount requested in the collection request (i.e., $4,351.00). In one or more embodiments of the invention, the notification also includes information regarding a benefit that Rand will receive if he facilitates the in-person payment to Perrin's by Mat's. In the present example, the notification informs the recipient collecting entity (in this case, Rand) that fulfillment of the collection request will earn the collecting entity 20,000 bonus points in a rewards program.

Shortly after receiving the notification, Rand travels to Mat's Washateria. Mat, who is actually working that day, welcomes Rand into the Washateria. Once Rand explains the purpose of his visit, Mat is pleased to make the payment in person to Rand for his outstanding invoice with Perrin's Washing Machine Parts and Accessories store. To that end, Mat procures the company credit card and swipes it through the magnetic strip card reader attached to Rand's smart phone. The magnetic strip card reader provides information related to Mat's such as the business name, the account number of an account at the issuing bank associated with the card, the expiration date of the card, and a security code. Payment acceptance software executing on Rand's smart phone (i.e., in-person payment device (314)) receives this information from the magnetic strip card reader (318). Then, the in-person payment device, upon receipt of payment from Mat, successfully matches Mat's payment to Perrin's collection request.

Next, the in-person payment device uses the information received from the magnetic strip card reader and from the notification of the collection request received from the payment facilitation device to create a payment request to transmit to the payment facilitation device. Generally, a payment request from the in-person payment device of Rand would include information related to Rand and/or Rand's vacuum sales empire. However, because the payment is being made pursuant to a notification of a collection request from Perrin's, the in-person payment device (314) injects information related to Perrin's into a payment request. Thus, to a recipient, the payment request will appear as a request to pay Perrin's rather than Rand. The payment request is then sent to the payment facilitation device (304). Upon receipt, the payment facilitation device uses the information in the payment request in order to transmit payment to Perrin's account (326).

In the above scenario, Perrin's Washing Machine Parts and Accessories received payment from Mat's Washateria in a more timely fashion than would have been the case if Perrin's had waited for a remote payment. Furthermore, a transaction fee charged by a card network was reduced as a result of the payment being taken in person rather than via a remote method.

Figure 4:
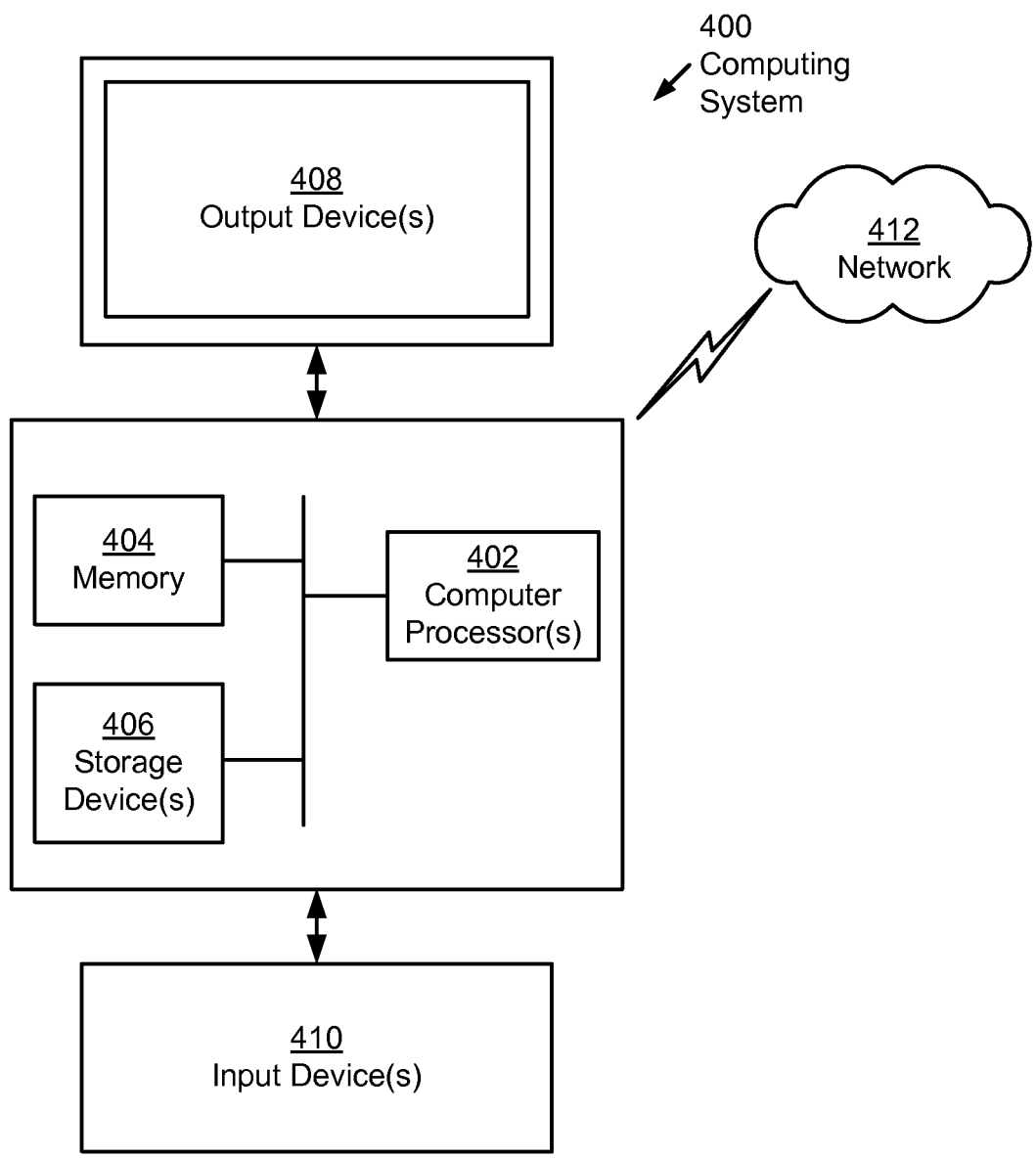
FIG. 4 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same as or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Additionally, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

One of ordinary skill in the pertinent art and having the benefit of this disclosure will appreciate that the payment facilitation device is a highly complex and specialized tool that is configured to create the concrete effect of reducing the fees paid by a merchant by providing opportunity for in-person payments, as well as increasing the timeliness of the payment to the merchant by a customer.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for obtaining payment from a customer comprising:
   receiving, over a wireless communication network, a collection request at a payment facilitation device from a payment collection request device of a merchant;
   storing the collection request in a collection request repository;
   determining, using the collection request, a location of the customer, wherein the location comprises an address of the customer;
   pinging a plurality of mobile in-person payment devices of a plurality of collecting entities;
   in response to the pinging, detecting a location of a mobile in-person payment device of the plurality of mobile in-person payment devices of the plurality of collecting entities;

determining, using the location of the customer and the location of the mobile in-person payment device of the plurality of mobile in-person payment devices of the plurality of collecting entities, that the mobile in-person payment device is located near the location of the customer;

transmitting, over the wireless communication network, a notice of collection request to the mobile in-person payment device of the plurality of mobile in-person payment devices of the plurality of collecting entities using a network connectivity component of the mobile in-person payment device, wherein the mobile in-person payment device:

receives, in response to receiving the notice of collection request over the wireless communication network, an in-person payment from the customer, creates, in response to receiving the in-person payment, a request to pay the merchant, and sends, to the payment facilitation device over the wireless communication network using the network connectivity component, the request to pay the merchant;

receiving, using the network connectivity component, a request to pay the merchant from the mobile in-person payment device; and transmitting, over the wireless communication network, based on the request to pay the merchant, a payment to the merchant account.

2. The method of claim 1, wherein the collection request comprises customer location information and a payment amount.

3. The method of claim 1, wherein the mobile in-person payment device of the plurality of mobile in-person payment devices of the plurality of collecting entities is a computing device comprising a payment acceptance software application and is operatively connected to a payment acceptance module.

4. The method of claim 1, wherein the notice of collection request comprises merchant information and a payment amount.

5. The method of claim 4, wherein the merchant information includes information associated with the merchant account.

6. The method of claim 4, wherein the request to pay the merchant comprises customer information and at least a portion of the merchant information.

7. The method of claim 6, wherein the customer information comprises information associated with a payment card of the customer.

8. A system for obtaining payment from a customer comprising:

a payment collection request device of a merchant configured to:

send, over a wireless communication network, a collection request to a payment facilitation device;

a plurality of mobile in-person payment devices of a plurality of collecting entities, each configured to:

receive, in response to receiving a notice of collection request over the wireless communication network, an in-person payment from the customer;

create, in response to receiving the in-person payment, a request to pay the merchant; and send, to the payment facilitation device over the wireless communication network, the request to pay the merchant using a network connectivity component of a mobile in-person payment device;

a computer processor;

a collection request repository; and the payment facilitation device comprising the computer processor and operatively connected to the payment collection request device and the mobile in-person payment device and configured to:

receive, over the wireless communication network, a collection request from the payment collection request device of the merchant;

store the collection request in the collection request repository;

determine, using the collection request, a location of the customer, wherein the location of the customer comprises an address of the customer;

ping the plurality of mobile in-person payment devices of the plurality of collecting entities;

in response to pinging the plurality of mobile in-person payment devices of the plurality of collecting entities, detect a location of a mobile in-person payment device of the plurality of mobile in-person payment devices of the plurality of collecting entities;

determine, using the location of the customer and the location of the mobile in-person payment device of the plurality of mobile in-person payment devices of the plurality of collecting entities, that the mobile in-person payment device of the plurality of mobile in-person payment devices of the plurality of collecting entities is located near the location of the customer;

transmit, over the wireless communication network, the notice of collection request to the mobile in-person payment device of the plurality of mobile in-person payment devices of the plurality of collecting entities using the network connectivity component;

receive, using the network connectivity component, a request to pay the merchant from the mobile in-person payment device of the plurality of mobile in-person payment devices of the plurality of collecting entities; and transmit, over the wireless communication network, based on the request to pay the merchant, a payment to the merchant account.

9. The system of claim 8, further comprising a payment acceptance module operatively connected to the mobile in-person payment device of the plurality of mobile in-person payment devices of the plurality of collecting entities.

10. The system of claim 8, wherein the payment facilitation device is operatively connected to the payment collection request device and the mobile in-person payment device of the plurality of mobile in-person payment devices of the plurality of collecting entities via the wireless communication network.

11. The system of claim 8, wherein the collection request comprises customer location information and a payment amount.

12. The system of claim 8, wherein the mobile in-person payment device of the plurality of mobile in-person payment devices of the plurality of collecting entities is a computing device comprising a payment acceptance software application and is operatively connected to a payment acceptance module.

13. The system of claim 12, wherein the computing device is one selected from a group consisting of a mobile device, a desktop computer, a server, and an automated teller machine.

14. The system of claim 8, wherein the notice of collection request comprises merchant information and a payment amount.

15. The system of claim 14, wherein the merchant information includes information associated with the merchant account.

16. The system of claim 14, wherein the request to pay the merchant comprises customer information and at least a portion of the merchant information.

17. The system of claim 16, wherein the customer information comprises information associated with a payment card of the customer.

18. A non-transitory computer readable medium comprising instructions for obtaining payment from a customer which, when executed by a computer, cause a computer processor to:
   receive, over a wireless communication network, a collection request at a payment facilitation device from a payment collection request device of a merchant;
   store the collection request in a collection request repository;
   determine, using the collection request, a location of the customer, wherein the location comprises an address of the customer;
   ping a plurality of mobile in-person payment devices of a plurality of collecting entities;
   in response to pinging the plurality of mobile in-person payment devices of a plurality of collecting entities, detect a location of a mobile in-person payment device of the plurality of mobile in-person payment devices;
   determine, using the location of the customer and the location of the mobile in-person payment device of the plurality of mobile in-person payment devices, that the mobile in-person payment device is located near the location of the customer;
   transmit, over the wireless communication network, a notice of collection request to the mobile in-person payment device of the plurality of mobile in-person payment devices using a network connectivity component of the mobile in-person payment device, wherein the mobile in-person payment device:
      receives, in response to receiving the notice of collection request over the wireless communication network, an in-person payment from the customer,
      creates, in response to receiving the in-person payment, a request to pay the merchant, and
      sends, to the payment facilitation device over the wireless communication network using the network connectivity component, the request to pay the merchant;
   receive, using the network connectivity component, a request to pay the merchant from the mobile in-person payment device; and
   transmit, over the wireless communication network, based on the request to pay the merchant, a payment to the merchant account.

19. The non-transitory computer readable medium of claim 18, wherein the collection request comprises customer location information and a payment amount.

20. The non-transitory computer readable medium of claim 18, wherein the notice of collection request comprises merchant information and a payment amount.

* * * * *